March 19, 1940.  E. E. WEMP  2,194,040
AUTOMOTIVE VEHICLE CLUTCH
Filed March 28, 1938  2 Sheets-Sheet 1

INVENTOR.
Ernest E. Wemp
BY
Barnes, Kisselle, Laughlin & Raisch
ATTORNEYS

March 19, 1940.  E. E. WEMP  2,194,040
AUTOMOTIVE VEHICLE CLUTCH
Filed March 28, 1938   2 Sheets-Sheet 2
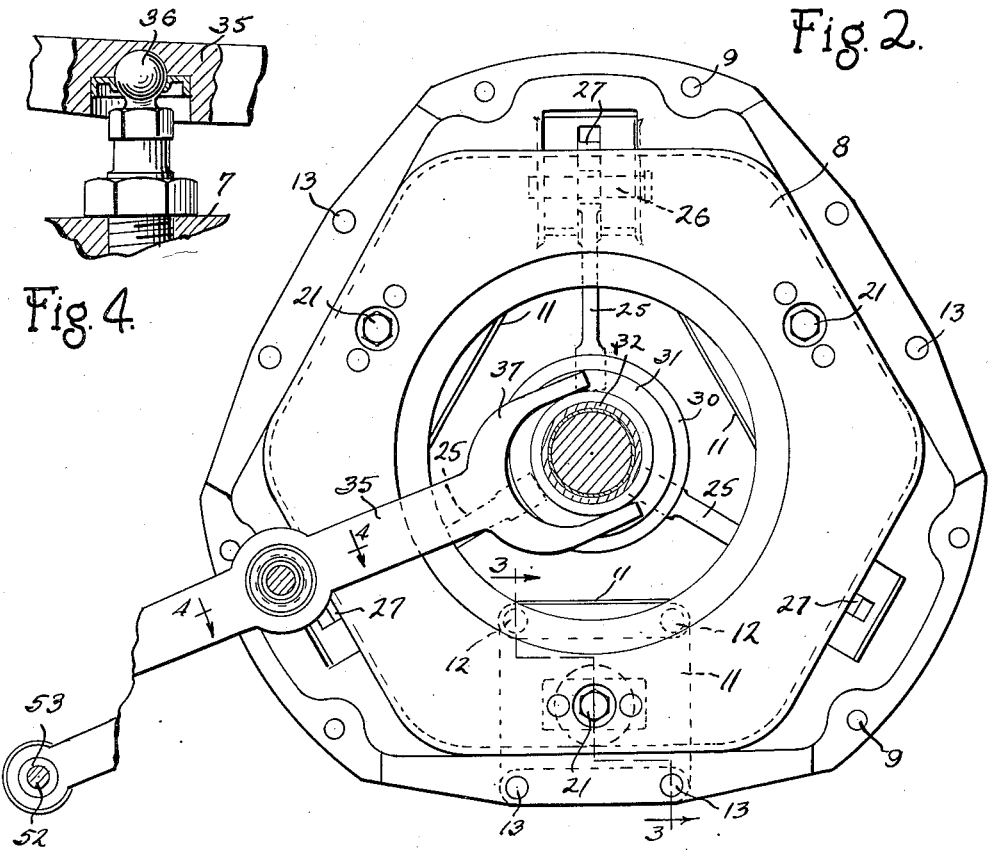
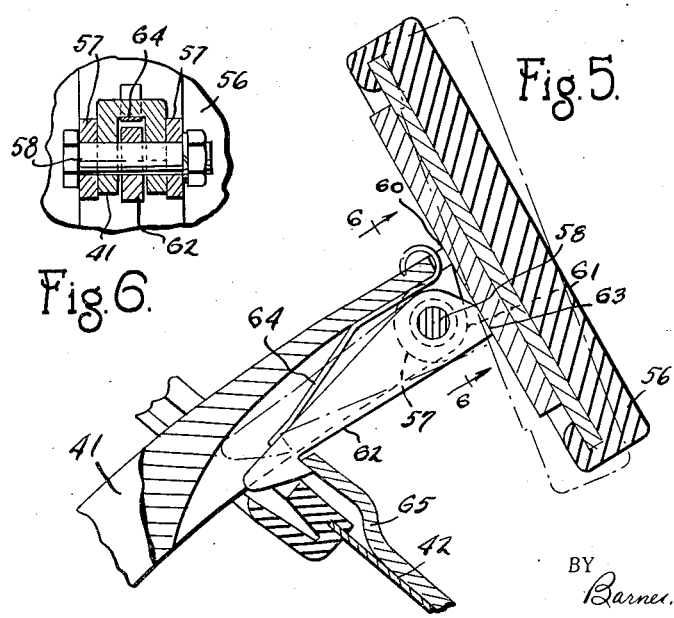
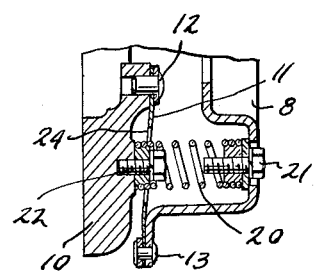
INVENTOR.
Ernest E. Wemp
BY Barnes, Kuelle, Laughlin & Rausch
ATTORNEYS Patented Mar. 19, 1940

2,194,040

UNITED STATES PATENT OFFICE 2,194,040

AUTOMOTIVE VEHICLE CLUTCH

Ernest E. Wemp, Detroit, Mich.

Application March 28, 1938, Serial No. 198,386

10 Claims. (Cl. 192—89)

This invention relates to clutches, particularly for use with automotive vehicles.

The invention aims to provide an improved arrangement in a clutch and in the operating and control mechanism therefor, wherein clutch engagement is effected by the physical effort of the operator. Heretofore it has been most generally the practice to use clutches in automotive vehicles which are engaged by spring pressure. Such a clutch is disengaged when the operator overcomes the spring pressure by physical force or otherwise; the engagement of such a clutch is obtained, where it is operated in the usual manner as by means of a foot pedal, by the operator allowing the foot pedal to retract, and the control action of clutch engagement is obtained solely by governing the movement or motion of the lever. With the present invention the clutch is engaged, for example, by the operator depressing the foot pedal or lever, and the engaging action is controlled by the combined actions of movement and pressure. In this way the operator can sense a more delicate "feel" of the clutch engaging action and thus obtain a nicety of clutch engagement.

Accordingly, a clutch is constructed which does not incorporate clutch packing springs or other packing means, and preferably resilient means, such as a spring, is interposed between a lever or device which is operated by physical effort. The arrangement is such that the clutch is normally disengaged, and the control mechanism may be locked in clutch engaged position. The location of the parts when locked is such as to provide an adequate torque capacity. However, in accordance with the invention additional or excess torque capacity may be obtained to take care of extreme conditions where necessary. But, preferably, excess torque capacity is obtained only so long as the additional physical effort is applied.

One construction for carrying out the invention is disclosed in the accompanying drawings wherein:

Fig. 2 is a rear view showing the clutch cover plate in elevation and illustrating some parts in section.

Fig. 3 is a detail sectional view taken substantially on line 3—3 of Fig. 2.

Fig. 4 is a detail sectional view taken substantially on line 4—4 of Fig. 2 showing a fulcrum mounting for a clutch release lever.

Fig. 5 is a detail view of the foot pad construction for the pedal.

Fig. 6 is a sectional detail taken substantially on line 6—6 of Fig. 5.

Figure 1:
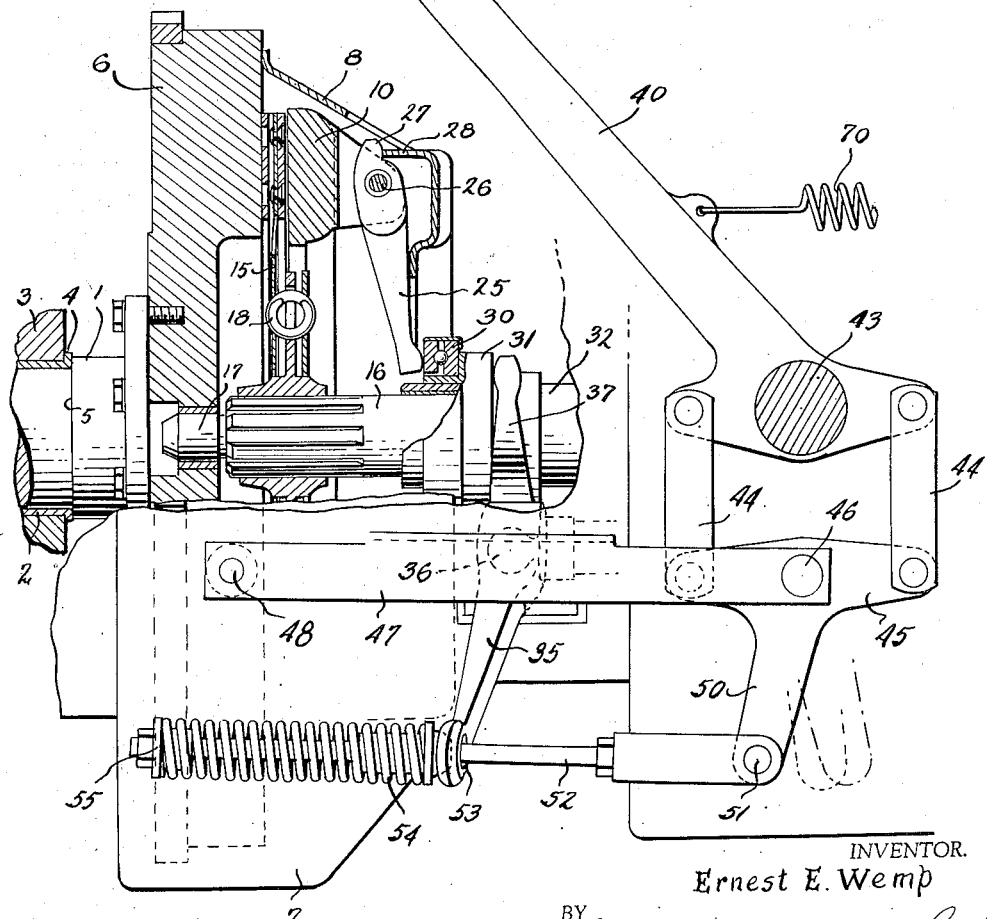
Fig. 1 is a general view illustrating the invention, with parts cut away and some parts in section so as to illustrate the clutch and its operating mechanism.

In Fig. 1 the crank-shaft of an internal combustion engine is illustrated at 1 and the rear bearing of the engine is illustrated at 2 supported in a part 3 of the engine, and, as illustrated, the bearing has a flange 4 against which a shoulder 5 of the crank-shaft may abut. This bearing arrangement between the parts 4 and 5 is to take a thrust.

The flywheel of the engine is illustrated at 6 and it is located in the so-called bell housing 7 of the engine. The clutch construction may be associated with the flywheel in the usual manner; a clutch cover plate 8, the general shape of which is shown in Fig. 2, is secured to the flywheel by cap screws taken through apertures 9. A pressure plate is illustrated at 10 and it is arranged to be driven with the flywheel and cover plate and to be shifted axially. A mounting for this purpose may take the form of segmental flexible plates, such as steel plates, illustrated at 11 (Fig. 3) secured to the pressure plate as at 12 and to the cover plate as at 13. As shown in Fig. 2, there may be three of such segmental driving plates. These plates transmit the driving action from the cover plate to the pressure plate, serve to center the pressure plate and are flexible for axial shift of the pressure plate. The portions of the cover plate to which the segmental drive plates are secured, may flex to facilitate axial shift of the pressure plate, in which action points 12 shift in a straight line.

A driven disc 15 is disposed between the flywheel and the pressure plate, and it is mounted on a driven shaft 16. The end of the driven shaft may be piloted in the flywheel as illustrated at 17. The driven disc may incorporate a vibration dampening structure generally illustrated at 18.

The clutch is normally held disengaged by retractor springs 20 connected to the cover plate at 21 and to the pressure plate at 22. As shown in Fig. 2, there may be three of such retractor springs, and they may extend through apertures 24 in the segmental drive plates 11.

Clutch engaging levers are illustrated at 25 and are pivotally mounted in bifurcated lugs on the pressure plate, as illustrated at 26. This is the load point for each lever. The levers have end portions 27 arranged to abut against portions 28 of the cover plate fashioned to an appropriate position for this purpose, and the parts 26 constitute fulcrum points. The inner ends of the levers receive the work to be applied thereto through the means of a bearing 30 preferably of the antifriction type, associated with a reciprocable member 31 slidably mounted on a fixed member 32 which may be an extension of the usual housing for the gear shift transmission (not shown). Thus the clutch levers are of the second order.

A clutch control arm is generally illustrated at 35 and which preferably has a ball type mounting on the bell housing 7. As shown in Fig. 5, a suitable ball and support therefor may be mounted in the bell housing and the ball itself is illustrated at 36. This lever extends through the bell housing and the inner end is of yoke formation, the yoke formation being illustrated at 37 and engaging the member 31. As illustrated in Fig. 2, the clutch control arm 35 may be disposed angularly relative to the horizontal, although its particular disposition from this standpoint is relatively unimportant except that this facilitates associating and adapting the control arm to the operating mechanism.

A so-called clutch pedal in the form of a lever is illustrated at 40 having an arm 41 extending through the floor boards 42 of the vehicle, and having a fixed fulcrum 43. This pedal is operably connected to the clutch control arm, and the construction shown embodies parallel links and associated mechanism to permit of movements of the engine on its resilient mounting without disturbing the pedal. Parallel links 44 connect to opposite arms of a member 45, which member is fulcrumed as at 46 on a reaction arm 47 pivotally mounted as at 48 to the engine, and more specifically to the bell housing 7. The member 47 may be of double or yoke formation so as to embrace opposite sides of the piece 45. The member 45 has an arm 50 and pivotally connected thereto as at 51 is a rod 52 which extends through an aperture 53 in the outer end of the clutch control arm. A coil spring 54 is disposed between the clutch control arm and an abutment 55 on the end of the rod 52.

The clutch pedal is equipped with a foot pad 56 which has ears or lugs 57 embracing opposite sides of the piece 41 and pivoted thereto by a pin 58. The end of the member 41 is arranged to contact with the foot pad substantially at the point 60, and the end of the member 41 is shaped to fall away from the foot pad on the side of the pin 58 opposite the contact 60, the contour being illustrated at 61.

The member 41 is provided with a recess for the reception of a latch 62 which has a heel 63 arranged substantially opposite the point of contact 60. The heel 63 projects beyond the portion 61. This latch is pivotally mounted on the pin 58. A spring 64 acts upon the latch to hold it in a normally projected position which is shown as the full line position in Fig. 5. This latch is arranged to catch and hold to a latch plate 65.

The operation and function of the clutch is as follows: With the parts in the full line position illustrated in Fig. 1, the clutch is disengaged. The retractor springs 20 have retracted the pressure plate, and in so doing have shifted the clutch control arm 35 and the various linkage connected to the pedal. The clutch pedal may be provided with a return spring 70. To engage the clutch the operator places a foot on the pad 56 and depresses the pedal. This causes the member 45 to rock counter-clockwise on its pivot point and to pull on the clutch arm 35 through the compression spring 54. This rocks the clutch arm 35 in a counter-clockwise direction as it is viewed in Fig. 1, and the yoke end shifts the bearing 30 to the left. The bearing engages the inner ends of the clutch levers 25, of which there are three in number, and the levers fulcrum on the parts 28 and the load is delivered to the pressure plate through the load points 26. This shifts the pressure plate to the left and causes engagement of the clutch. If it is desired that the clutch remain engaged, the lever may be depressed until the latch 62 snaps into engagement with the latch plate 65. At this time the pad 56 is substantially in the position marked A in Fig. 1.

The initial depression of the lever takes place against a very light spring action, namely, that of the relatively light retractor spring 20 and the return spring 70 where a return spring is used. As the clutch begins to engage and more pressure is applied the spring 54 is compressed. This compression continues until the clutch is engaged from the standpoint of providing normal torque capacity of the clutch, at which time the latch 62 is in position to engage the latch plate 65.

The arrangement is preferably such that a pressure substantially corresponding to that required to release a clutch having clutch packing springs is all that is required to fully engage the clutch. It will be seen that the operator has a considerable lever advantage in operating through the clutch pedal and the clutch levers 25. Use of levers of the second order increases the lever advantage, since the effective length of the levers is from the inner ends where the work is applied to the fulcrum 28. For example, a pressure of say about 35 lbs. may be adequate for obtaining a clutch packing pressure of about 1200 lbs. In this example, the spring 54 is of such construction as to impart a 1200 lb. packing pressure when the pedal has been latched in position A. These figures are given only for exemplary purposes.

It will be noted that when the clutch is disengaged there is practically no load on the pressure plate. The retractor springs may place a light load on the pressure plate. The flexible drive plates hold the pressure plate firmly so that vibrations in the engine or a quick change in R. P. M. will not cause relative movement between the flywheel and the pressure plate. This is to distinguish over a clutch construction where the pressure plate has a sliding driving fit with a portion of the cover plate or a part secured to the cover plate or flywheel where some working clearance is necessary. Such a construction would permit of oscillation of the pressure plate with resultant objectionable noises, particularly where the pressure plate is unloaded when the clutch is disengaged. This condition would be acute with the unloaded pressure plate of the present clutch, as distinguished from a clutch having packing springs, which load the pressure plate when the clutch is disengaged so as to at least, in a measure, overcome the oscillation of the pressure plate. Therefore, flexible driving plates are a preferred mounting for the pressure plate in a clutch constructed in accordance with the invention.

In operating a vehicle, the vehicle may be standing at rest at a traffic light with the clutch disengaged in the position shown in Fig. 1, and the operator is not called upon to hold the clutch pedal depressed, even though the transmission be in gear. To start the vehicle the clutch pedal is depressed and then released for shift into another gear, and so on until the transmission is in high gear, at which time the pedal may be latched in down position. Any time it is desired to engage the clutch without causing the pedal to latch in down position, pressure may be applied to the pad 56 at the lower or heel portion, causing it to turn to the dotted line position shown in Fig. 5. This causes the pad to engage the heel 63 of the latch and swing it to the dotted line position where the latch is inoperative. When it is desired to latch the pedal in down position, the pressure may be applied to the upper or toe portion of the pad 56. The pedal may be released from its latched position by applying pressure to the lower portion of the pad 56 to thus raise the latch from engagement with the latch plate 65.

It will thus be seen that the clutch is engaged by physical effort of the operator which, for convenience, is termed "manual" in the appended claims. Clutch engagement may be accomplished with a nicety since it is feasible for the operator to delicately sense or feel the action. This "feel" is easily sensed due to the fact that the operator is not only required to apply pressure, which gives an intelligible reaction, but also shifts the pedal through a range of movement. The combined range of movement and applied pressure provides this nicety of control.

As stated above the clutch is fully engaged for normal maximum torque when latch in position A. There are times, however, when it may be desirable to have an additional amount of clutch torque capacity, as for example, when the vehicle is being jumped from a sand hole or mud hole. To obtain this the operator may depress the pedal beyond the position A, as for example, to the position B. This further compresses the spring 54, and adds more clutch packing pressure to the pressure plate.

With this clutch there is an end thrust on the engine crank-shaft all the while the engine is operating with the clutch engaged because of the pressure applied to the pressure plate, which is in a direction to the left as Fig. 1 is viewed. This end thrust pressure is likewise constantly applied to the bearing 30 during clutch engagement. However, the bearing construction shown in Fig. 1 for the crank-shaft is arranged to take this thrust. More particularly the thrust, in the form of clutch shown, is delivered through the shoulder 5 into the flange 4 of the rear main bearing for the crank-shaft, to the part 3 of the engine and finally to the connection 28 and to the clutch lever.

I claim:

1. In a clutch construction for an automotive vehicle, the combination of driving and driven members arranged to be packed into engagement, means for normally holding the members in disengaged relation, a manually operable lever constituting the sole clutch engaging means, means interconnecting the lever and a driving member of the clutch including a force delivering spring for packing the driving and driven members into engagement, a latch for holding the lever in a position between the limits of extreme positions with the clutch engaged with a packing pressure to provide normal clutch torque capacity for the vehicle, said lever being shiftable beyond the latched position toward an extreme position to stress said spring and provide excess torque capacity in the clutch for abnormal conditions, and means for releasing the latch for clutch disengagement.

2. In a clutch for an automotive vehicle, the combination of driving and driven members arranged to be packed into engagement, one of said driving members being axially shiftable, means normally holding the shiftable driving member retracted for clutch disengagement, a plurality of multiplying clutch levers having a fulcrum on one driving member and a resistance connection on the other driving member, a manually operable lever positioned outside of the clutch construction for the service operation of clutch engagement and disengagement, a thrust bearing for applying power to the levers, means interconnecting the manually operable lever and the thrust bearing including a force delivering spring located outside of the clutch construction, for shifting the clutch levers to cause the driving and driven members to be packed together with attendant stress of said spring, a latch for holding the lever in shifted position to take the reaction of the spring with the spring holding the clutch engaged by force delivered through the thrust bearing and the clutch levers, and means for releasing the latch for clutch disengagement.

3. In a clutch for an internal combustion engine, the combination of driving and driven members arranged to be packed into engagement, one of said driving members being axially shiftable, the other driving member being secured to the engine shaft means normally holding the shiftable driving member retracted for clutch disengagement, a plurality of multiplying clutch levers of the second order each having a fulcrum on one driving member and a resistance connection with the other driving member, a manually operable lever positioned outside of the clutch construction, an antifriction thrust bearing for applying power to the levers, means interconnecting the manually operable lever and the thrust bearing including a force delivering spring located outside of the clutch construction for shifting the clutch levers to cause the driving and driven members to be packed together with attendant stress of said spring and thrust on the engine shaft, a latch for holding the lever in shifted position to take the reaction of the spring with the spring holding the clutch engaged by force delivered through the thrust bearing and the clutch levers, and means for releasing the latch for clutch disengagement.

4. A clutch comprising a driving member, a pressure plate, a plurality of substantially flat circumferentially spaced flexible sheet metal members each connected to the driving member and the pressure plate at its opposite ends for transmitting driving forces to the pressure plate and for holding the pressure plate centered and arranged to flex for axial shift of the pressure plate, a driven member arranged to be packed between the driving member and the pressure plate, a plurality of clutch levers pivotally mounted on the pressure plate and rotatable with the pressure plate, means outside of the clutch construction for delivering axial forces to the pressure plate through said levers to shift it into packed relation with the driven member to engage the clutch, said means being operable to relieve the axial pressure for clutch disengagement by movement of the pressure plate axially away from the driven disc, said pressure plate and levers being substantially free of load while the clutch is in disengaged condition, said flexible sheet metal members serving to firmly hold the pressure plate against oscillation relative to the driving member while the clutch is disengaged with the pressure plate substantially free of axial load.

5. A clutch for an internal combustion engine comprising, a driving member connected to the driving crankshaft, a pressure plate connected to be driven by a driving member and axially movable relative thereto, a driven disc arranged to be packed between the driving member and pressure plate, and including means for normally holding the pressure plate from packed position, a plurality of clutch levers each having a fulcrum point and a resistance point, one point being on the driving member and the other on the pressure plate, the inner ends of the levers being disposed in proximity to the axis of the clutch and adapted to have power applied thereto, an antifriction thrust member for applying power to the levers to rock the same and engage the clutch, said levers being arranged to rotate with the driving member and constituting a part of the clutch structure, a manually operable lever constituting the sole clutch operating means and disposed outside and independently of the clutch structure, means including a spring coupling for establishing a connection between the lever and the thrust bearing whereby movement of the lever by manual operation shifts the thrust bearing to rock the levers and effect clutch service engagement with resultant flexing of the spring and thrust upon the engine shaft, a latch for holding the lever in clutch engaging position, and means for shifting the latch to release it for clutch service disengagement.

6. A clutch for an internal combustion engine comprising, a driving member connected to the driving crankshaft, a pressure plate connected to be driven by a driving member and axially movable relative thereto, a driven disc arranged to be packed between the driving member and pressure plate, a plurality of clutch levers each having a fulcrum point and a resistance point, one point being on the driving member and the other on the pressure plate, the inner ends of the levers being disposed in proximity to the axis of the clutch and adapted to have power applied thereto, an antifriction thrust member for applying power to the levers to rock the same and engage the clutch, said levers being arranged to rotate with the driving member and constituting a part of the clutch structure, a pedal constituting the sole clutch control means and disposed outside and independently of the clutch structure, means including a spring coupling for establishing a connection between the pedal and the thrust bearing whereby movement of the pedal by manual operation shifts the thrust bearing to rock the levers and effect clutch engagement with resultant flexing of the spring and thrust upon the engine shaft, a latch for holding the pedal in clutch engaging position, and means associated with the pedal for shifting the latch to release it for clutch disengagement.

7. A clutch comprising a driving member, a second driving member, a plurality of flexible metal members connecting the two driving members and arranged to transmit forces from one driving member to the other and to hold the second driving member centered and being lightly flexible for axial shift of the second driving member, a driven member arranged to be packed between the driving members, clutch packing means, a plurality of clutch levers each having a pivotal association with the driving members and rotatable therewith, and through which the packing means loads the second driving member for clutch engagement, said flexible metal members being substantially free of the load exerted by the packing means, means operable to relieve the packing load on the second driving member for clutch disengagement, the said flexible metal members serving to firmly hold the second driving member against oscillation relative to the first driving member while the clutch is disengaged and with the second driving member substantially free of said load.

8. A clutch comprising a driving member, a pressure plate, a plurality of flexible metal members each connected to the driving member and the pressure plate for the transmission of driving forces from the driving member to the pressure plate and for holding the pressure plate centered, said flexible metal members being constructed to flex for axial shift of the pressure plate, a driven member arranged to be packed between the driving member and the pressure plate, a plurality of clutch levers structurally separate from the flexible members and each having a pivotal association with the driving member and pressure plate and rotatable therewith, means outside the clutch construction for delivering force through said levers to axially shift the pressure plate into packed relation with the driven member to engage the clutch with the levers under load, said means being operable to relieve the force on the pressure plate for clutch disengagement, and said flexible metal members serving to firmly hold the pressure plate against oscillation relative to the driving member while the clutch is disengaged with the pressure plate substantially free of said load.

9. A clutch comprising, a driving member, a pressure plate member, intermediate means connected to the driving member to rotate therewith, a plurality of flexible metal members, each connected with the intermediate means and the pressure plate member for transmitting forces from one member to the other and for holding the pressure plate member centered, a driven member arranged to be packed between the driving member and pressure plate member, said flexible metal members being arranged to flex for axial shift of the pressure plate member, a plurality of levers operably associating the intermediate means and the pressure plate member independently of the flexible metal members and rotatable therewith, means for delivering force through said levers to load the pressure plate member into packed relation with the driven member to engage the clutch with the levers under load and arranged for relief of the load on the pressure plate member for clutch disengagement, the flexible metal members serving to firmly hold the pressure plate member against oscillation relative to the driving member and intermediate means while the clutch is disengaged with the pressure plate substantially free of said load.

10. A clutch comprising, a driving member, a pressure plate member, intermediate means connected to the driving member to rotate therewith, a plurality of flexible members of sheet-like metal, each connected to the intermediate means and the pressure plate member for transmitting forces from one member to the other and for holding the pressure plate member centered, a driven member arranged to be packed between the driving member and pressure plate member, said flexible metal members being arranged to flex for axial shift of the pressure plate member, a plurality of relatively non-flexible levers each having a pivotal association with the intermediate means and the pressure plate member and rotatable therewith, means outside the clutch construction for delivering force through said levers in one direction only to load the levers and pressure plate and to urge the pressure plate member into packed relation with the driven member to engage the clutch with the levers under load, said means being operable to relieve said load for clutch disengagement, the flexible metal members serving to firmly hold the pressure plate member against oscillation relative to the driving member and intermediate means while the clutch is disengaged with the pressure plate and levers substantially free of said load.

ERNEST E. WEMP.